United States Patent
Macaluso (10) Patent No.: US 11,073,125 B1
(45) Date of Patent: Jul. 27, 2021

(54) METHODS AND APPARATUS FOR GENERATING ELECTRICITY FROM MOVING FLUID

(71) Applicant: Anthony Macaluso, San Diego, CA (US)

(72) Inventor: Anthony Macaluso, San Diego, CA (US)

(*) Notice: Subject to any disclaimer, the term of this patent is extended or adjusted under 35 U.S.C. 154(b) by 0 days.

(21) Appl. No.: 17/208,807

(22) Filed: Mar. 22, 2021

Related U.S. Application Data (63) Continuation of application No. PCT/US2020/055280, filed on Oct. 12, 2020.

(60) Provisional application No. 62/956,028, filed on Dec. 31, 2019, provisional application No. 62/914,920, filed on Oct. 14, 2019.

(51) Int. Cl.
*F03B 13/10* (2006.01)
*E03B 7/07* (2006.01)
*H02K 7/18* (2006.01)

(52) U.S. Cl.
CPC .............. *F03B 13/10* (2013.01); *E03B 7/07* (2013.01); *H02K 7/1823* (2013.01)

(58) Field of Classification Search
CPC .......... F03B 13/10; H02K 7/1823; E03B 7/07
See application file for complete search history.

(56) References Cited

U.S. PATENT DOCUMENTS

| | | |
|---|---|---|
| 2006/0032374 A1 | 2/2006 | Vrana et al. |
| 2008/0202119 A1 | 8/2008 | Stewart |
| 2011/0025068 A1* | 2/2011 | Campbell .............. F03B 13/06 290/52 |
| 2011/0254647 A1 | 10/2011 | Bacarisse |
| 2012/0081097 A1 | 4/2012 | Birnbach |
| 2014/0176273 A1 | 6/2014 | Elick et al. |
| 2015/0292660 A1 | 10/2015 | Mathews et al. |
| 2016/0341064 A1 | 11/2016 | Samaras et al. |
| 2018/0045599 A1 | 2/2018 | Larach |

FOREIGN PATENT DOCUMENTS

WO  WO 2018/046979 A1  3/2018

OTHER PUBLICATIONS

International Search Report and Written Opinion; PCT/US2020/55280; dated Feb. 26, 2021; 22 pages.

* cited by examiner

*Primary Examiner* — Viet P Nguyen
*Assistant Examiner* — S. Mikailoff
(74) *Attorney, Agent, or Firm* — Knobbe, Martens, Olson & Bear, LLP (57) ABSTRACT

In one aspect, a system for generating electricity based on water flow is disclosed. The system comprises a first pipe fitting, a turbine, and a second pipe fitting. The first pipe fitting couples to a pipe that supplies a fluid to a building. The turbine is in fluid communication with the first pipe fitting and rotates in response to a kinetic energy of the fluid supplied by the pipe flowing through the turbine, generates electricity in response to rotation of the turbine, and reduces a pressure of the fluid from a first pressure to a second pressure. The second pipe fitting couples the turbine to an input pipe of the building. The turbine further comprises a conversion circuit that conditions the generated electricity for consumption by the building and conveys the generated electricity to the building via one or more conductors.

17 Claims, 4 Drawing Sheets

METHODS AND APPARATUS FOR GENERATING ELECTRICITY FROM MOVING FLUID

RELATED APPLICATIONS

This application is a continuation of International PCT Application No. PCT/US2020/055280 filed Oct. 12, 2020, which claims priority to both U.S. Provisional Application No. 62/914,920 filed Oct. 14, 2019 and U.S. Provisional Application No. 62/956,028 filed Dec. 31, 2019, the entire content of each of which is hereby incorporated by reference herein.

BACKGROUND

Field of the Disclosure

The present disclosure relates generally to generating electricity, and more specifically, to generating electricity based on fluid distribution systems.

Description of the Related Art

Millions of buildings around the country receive water (for example, fresh water, well water, treated water, and so forth) from a municipal (or similar) water supply distribution system. Generally, the water supply distribution system pumps water to the buildings at a higher water pressure than the piping within the buildings is able to handle. This is because each building generally has the same or similar internal water pressures, and to maintain the water pressures within the buildings at particular set points or thresholds, the water pressure in the water supply distribution system must be at a higher pressure than the water pressure within the buildings.

To convert the high water pressure in the water supply distribution system to the lower water pressure level that is safe for the piping within the buildings, each building may have a water pressure reducing component that connects the piping within the building to the water supply distribution system outside the building. These water pressure reducing components may comprise a water pressure regulator or similar component, which reduces the water pressure coming from a main line of the building (that connects the building to the water supply distribution system). The water pressure regulator may reduce the water pressure to a safe level before the water reaches any piping or plumping components within the building.

However, such water pressure regulators provide few additional benefits to the reduced water pressure and generally "waste" the energy in the higher pressure water between the water supply distribution system and the building's internal piping. As such, alternatives for water pressure regulators that provide additional benefits are desirable.

SUMMARY

Various embodiments of systems, methods and devices within the scope of the appended claims each have several aspects, no single one of which is solely responsible for the desirable attributes described herein. Without limiting the scope of the appended claims, some prominent features are described herein.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

In one aspect, a system for generating electricity based on water flow is disclosed. The system comprises a first pipe fitting, a turbine, and a second pipe fitting. The first pipe fitting is configured to couple to a pipe that supplies a fluid to a building from a supply distribution system. The turbine comprises an inlet and an outlet in fluid communication with the first pipe fitting and is configured to rotate in response to a kinetic energy of the fluid supplied by the pipe from the supply distribution system flowing through the turbine, generate electricity in response to rotation of the turbine, and reduce a pressure of the fluid from a first pressure to a second pressure between the inlet and the outlet. The second pipe fitting is in fluid communication with the outlet of the turbine and configured to couple the turbine to an input pipe of the building. The turbine further comprises a conversion circuit configured to condition the generated electricity generated by the turbine for consumption by the building and convey the generated electricity to the building via one or more conductors. The fluid flows through the turbine when the building demands the fluid through the input pipe.

In some aspects, the turbine is configured to: rotate in response to a kinetic energy of the fluid supplied by the pipe from the supply distribution system flowing through the turbine, generate electricity in response to rotation of the turbine, and reduce a pressure of the fluid from a first pressure to a second pressure between the inlet and the outlet. In some aspects, the conversion circuit is configured to: condition the generated electricity generated by the turbine for consumption by the building, and convey the generated electricity to the building via one or more conductors. In some aspects, the fluid is water and wherein the turbine is configured to: generate distilled water based on causing a portion of the water flowing through the turbine to evaporate and condense and convey the distilled water to a distilled water storage tank. In some instances, the second pressure is established based on an input pressure requirement of the building. In aspects, the system further comprises a fluid recirculation loop configured to circulate fluid from the outlet to the supply distribution system when the building is not demanding fluid.

In another aspect, a system for generating electricity and distilled water for a building is disclosed. The system comprises a first input pipe that supplies water from a water distribution system and a first pressurization tank comprising an inlet and an outlet. The system further comprises a first pipe fitting configured to couple the input pipe to the inlet of the first pressurization tank in series through a first backflow protection valve (BPV) and a first emergency stop valve (ESV), a turbine configured to rotate in response to water that flows through the turbine from an input to an outlet, and a second pipe fitting configured to couple the outlet of the first pressurization tank to the inlet of the turbine in series through a second BPV and a second ESV. The system also comprises a second pressurization tank comprising an inlet and an outlet, a third pipe fitting configured to couple the outlet of the turbine to the inlet of the second pressurization tank in series through a third BPV and a third ESV, a water circulation system comprising an inlet and an outlet, a second input pipe that provides water from the second pressurization tank to the building, a fourth pipe fitting configured to couple the outlet of the second pressurization tank to the inlet of the water circulation system and the second input pipe to the building, and a fifth pipe fitting configured to couple the outlet of the water circulation system to the water distribution system.

In some aspects, the turbine is further configured to generate electricity in response to rotating in response to the water that flows through the turbine and wherein the generated electricity is provided to the building. In some aspects, the turbine is configured to reduce a pressure of the water from a first pressure to a second pressure between the inlet and the outlet of the turbine. The system may further comprises a conversion circuit configured to: condition the generated electricity generated by the turbine for consumption by the building and convey the generated electricity to the building via one or more conductors. In some aspects, the turbine is configured to: generate distilled water based on causing a portion of the water flowing through the turbine to evaporate and condense, convey the distilled water to a distilled water storage tank, and convey the distilled water to the building for consumption. In some aspects, the first pressurization tank is configured to maintain a water pressure at the inlet of the turbine at a first pressure threshold, wherein the first pressure threshold is established based on operational requirements of the turbine. In some aspects, the second pressurization tank is configured to maintain a water pressure at the outlet of the turbine at a second pressure threshold, wherein the second pressure threshold is established based on requirements of the building.

In another aspect, a method of generating electricity using any of the systems is disclosed.

In another aspect, a method of generating electricity is disclosed. The method comprises causing fluid to flow from a pipe that supplies the fluid from a supply distribution system to a turbine comprising an inlet in fluid communication with the first pipe and through the turbine to an outlet in fluid communication with an input pipe of the building and causing the turbine to rotate in response of the fluid flowing from the pipe that supplies the fluid from the supply distribution system to the input pipe of the building, wherein the turbine comprises a conversion circuit and wherein when the fluid is caused to flow from the pipe that supplies the fluid from the supply distribution system to the input pipe of the building in response to a building demand for the fluid.

In some aspects, causing the turbine to rotate comprises causing the turbine to rotate in response to a kinetic energy of the fluid supplied by the pipe from the supply distribution system flowing through the turbine and further comprising causing the turbine to: generate electricity in response to rotation of the turbine and reduce a pressure of the fluid from a first pressure to a second pressure between the inlet and the outlet. In some aspects, the method further comprises conditioning the generated electricity with a conversion circuit and conveying the conditioned electricity to the building via one or more conductors. In some aspects, the fluid is water and further comprising: generating distilled water via the turbine based on causing a portion of the water flowing through the turbine to evaporate and condense and conveying the distilled water to a distilled water storage tank. In some aspects, the second pressure is established based on an input pressure requirement of the building. In some aspects, the method further comprises recirculating the fluid from the outlet to the supply distribution system via a recirculation loop when the building is not demanding fluid.

In another aspects, a method of generating electricity and distilled water for a building is disclosed. The method comprises storing water from a water distribution system to a first pressurization tank, enabling flow of the water from the first pressurization tank through a turbine in response to the water having a first water pressure, and causing the turbine to rotate in response to the flow of the water through the turbine from an input to an outlet. In some aspects, the method also comprises storing the water from the turbine in a second pressurization tank, enabling flow of the water from the second pressurization tank into the building in response to the water having the second water pressure, causing excess water not flowing into the building to flow into a water circulation system in response to the water having the second water pressure, and recirculating the excess water through the water circulation system and back to the water distribution system in response to the water having the second water pressure and the excess water not flowing into the building.

In some aspects, the method further comprises causing the turbine to generate electricity in response to rotating in response to the flow of the water through the turbine, wherein the generated electricity is provided to the building. In some aspects, the method further comprises reducing a pressure of the water from the first water pressure to the second water pressure between the inlet and the outlet of the turbine. In some aspects, the method further comprises conditioning the generated electricity generated by the turbine for consumption by the building and conveying the generated electricity to the building via one or more conductors. In some aspects, the method further comprises generating distilled water based on causing a portion of the water flowing through the turbine to evaporate and condense, conveying the distilled water to a distilled water storage tank, and conveying the distilled water to the building for consumption. In some aspects, the method further comprises maintaining the first water pressure at a first water pressure threshold, wherein the first pressure threshold is established based on operational requirements of the turbine. In some aspects, the method further comprises maintaining the second water pressures at a second water pressure threshold, wherein the second pressure threshold is established based on requirements of the building.

The various features illustrated in the drawings may not be drawn to scale.

Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments. In some instances, some devices are shown in block diagram form.

Figure 1:
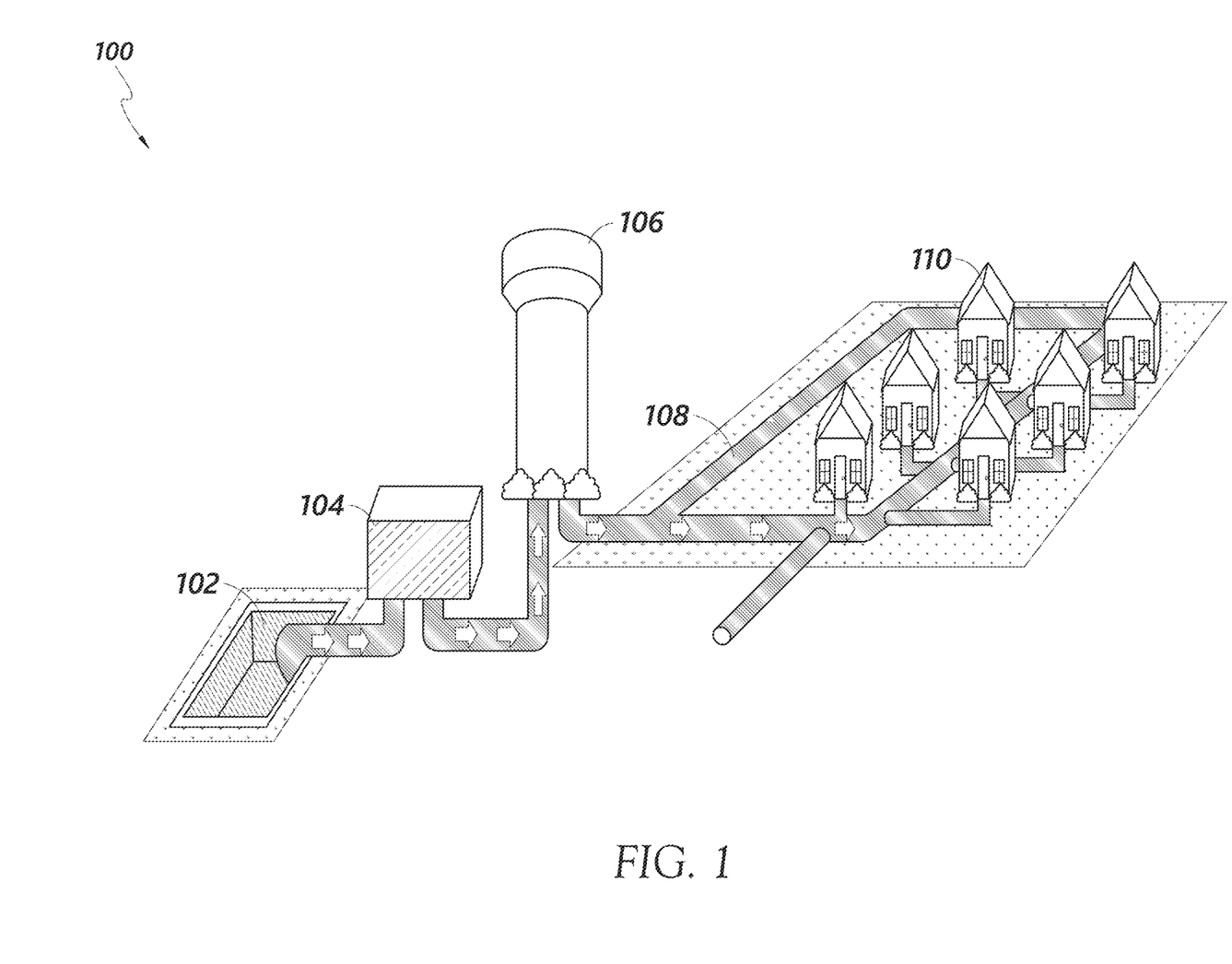
FIG. 1 is a diagram of a municipal water supply distribution system that distributes water to a plurality of buildings within an area.

As noted above, many buildings in the US consume water on a daily basis. FIG. 1 is a diagram of an example of a municipal water supply distribution system 100 that distributes water to a plurality of buildings within an area. The water supply distribution system 100 obtains water from a source 102 (for example, a well, a river, an aquifer, a reservoir, a water reclamation plants, and so forth). One or more pumps may pump the water through pipes (or otherwise convey or transport the water) from the source 102 to a water treatment plant 104. The water treatment plant 104 may treat the water from the source 102 to make the water safe for consumption and use. In some embodiments, the water treatment plant 104 adds one or more chemicals or exposes the water to one or more processes to make the water safe (for example, to drink, etc.). The water treatment plant 104 may then pump the treated water to a water storage tank 106. In some embodiments, one or more pumps in the pipes between the water treatment plant 104 and the water storage tank 106 may pump the treated water into the water storage tank 106. Water from the water storage tank (or directly from the treatment plant 104) may feed into a water main 108 that conveys the treated water to one or more buildings 110.

Each of the buildings 110 may expect to receive the treated water from the water main 108 at a particular water pressure or within a particular water pressure range. For example, water faucets and other appliances and/or devices within the buildings 110 may utilize water at a threshold water pressure to operate properly. For example, a refrigerator with a water dispenser in the buildings 110 may operate with a water pressure of between 20 pounds per square inch (PSI) and 120 PSI. In order to ensure that each of the buildings 110 receives water at a minimum pressure (for example, within a range of 40-80 PSI), the water main 108 may maintain water pressures of over 100 PSI. However, within the buildings 110, some faucets, appliances, and water piping connections within the buildings may not operates safely at pressures above 80 PSI. As such, each of the buildings 110 may include a water pressure regulator (described in more detail below with reference to FIG. 2). The water pressure regulator may reduce the water pressure of the treated water received from the water main 108 to a safe pressure for the buildings 110. More details regarding reducing water pressure between the water main 108 and the buildings 110 are provided below.

Figure 2:
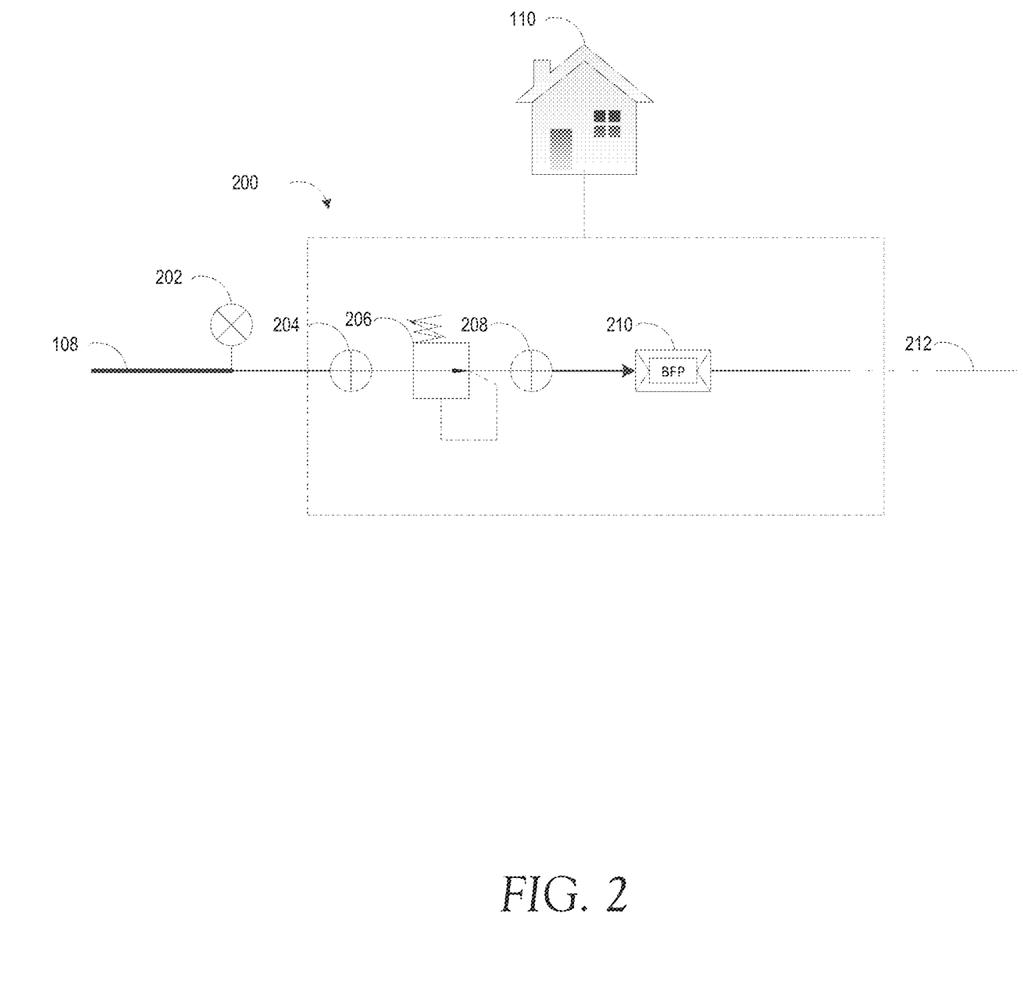
FIG. 2 is a diagram of a water connection between the water main of the municipal water supply distribution system FIG. 1 and one of the buildings.

FIG. 2 is a diagram of a water connection 200 between the water main 108 of the municipal water supply distribution system 100 of FIG. 1 and interior piping of one of the buildings 110. As shown in FIG. 2, the water connection 200 may comprise multiple components, including a water pressure gauge 202, one or more shutoff valves 204 and 208, a water pressure regulator 206, and a backflow preventer 210.

As described above, the water main 108 may include water at pressures of greater than 100 PSI, which may be dangerous for devices and/or fixtures within the buildings 110. As such, the water connection 200 between the water main 108 and the interior piping of the building 110 may reduce the water pressure to a safe, but usable level for use within the building 110. As shown, the water main 108 may be coupled to the pressure gauge 202 that measures a pressure of the water in the water main 108. After the water flows through the pressure gauge 202, the water may flow into the shutoff valve 204. The shutoff valve 204 may provide an opportunity to turn off water to the building 110 (for example, closing the pipe so that water cannot flow into the building 110). Downstream of the shutoff valve 204, the water pressure regulator 206 may reduce the water pressure of the water from the water mains 108 to a level that is safe but usable for the devices and so forth within the building 110. For example, the water pressure regulator 206 may reduce the water pressure from 100+ PSI in the water mains 108 to within the range of 40-70 PSI feeding into the building 110. Downstream of the water pressure regulator 206, the second shutoff valve 208 prevents the water from flowing into the building 110. The pair of shutoff valves 204 and 208 may enable isolation and replacement of the water pressure regulator 206 and/or any other components between the pair of shutoff valve 204 and 208 with minimal water leakage or issues. In some embodiments, the water flows through the second shutoff valve 208 and through a backflow prevention device 210, which prevents water from flowing from the building 110 into the water main 108. After the water flows through the backflow prevention device 210, the water flows to the fixtures, piping, and devices 212 within the building 110 (not shown in this figure) at the reduced pressure of between 40-70 PSI.

Along with the connections to the municipal water supply distribution system 100, many buildings in the U.S. (residential, commercial, industrial, and so forth) are connected to an electric grid to source electricity for consumption on a daily basis. The electric grid may receive or source power from any number of sources, including solar farms, wind farms, power plants, hydroelectric dams, and so forth. While some buildings are turning to alternatives to the electric grid to source power (for example, solar panels, wind turbines, water turbines, and so forth), these alternatives involve large capital expenditures, available space, and/or specialized resources for the corresponding equipment. For example, solar panels generally requires many square meters of space that is unobstructed from the sun to provide a useful amount of energy for most buildings. Similarly, wind turbines require open space to allow wind to flow to cause the wind turbines to rotate and generate electricity. Water turbines may require a nearby source of flowing water (for example, a stream or river) with sufficient water flow to cause the water turbine to rotate and generate electricity. Additionally, all of solar, wind, and hydroelectric alternatives involve an investment of many thousands of dollars to install a system that provides an adequate amount of electricity relative to consumption of electricity. Thus, wind and solar (and similar) alternatives may not be reasonable or feasible for many buildings and building owners.

An average United States residential home may use approximately 900 kilowatt-hours (kWh) of electricity each month, and generally speaking, this consumption is increasing. As the electricity consumption increases, costs for the electricity are also increasing. The increasing costs are promoting searches for additional alternatives to the solar, wind, and hydroelectric options described above or nuclear, coal, natural gas, and other non-renewable sources of electricity.

One potential alternative source for electricity may be the water that flows into buildings from the water supply distribution system 100 described above. Estimates suggest that an average U.S. household consumes between 80-100 gallons of water per person per day. Thus, water flowing from the water main 108 into the building 110 may be used to generate electricity for at least the 80-100 gallons of water consumed each day by each person in a household. Unfortunately, electricity generated by a generation system from such an amount of flowing water (80-100 gallons per person per day) may be limited and/or inconsequential as compared to the amount of electricity consumed by the household. However, if the electricity can be generated continuously (and not just when water is being consumed by the household), then the generation system may be able to generate electricity in larger quantities and supply, for example, upwards of 10% of the electricity consumed by the household each month.

Figure 3:
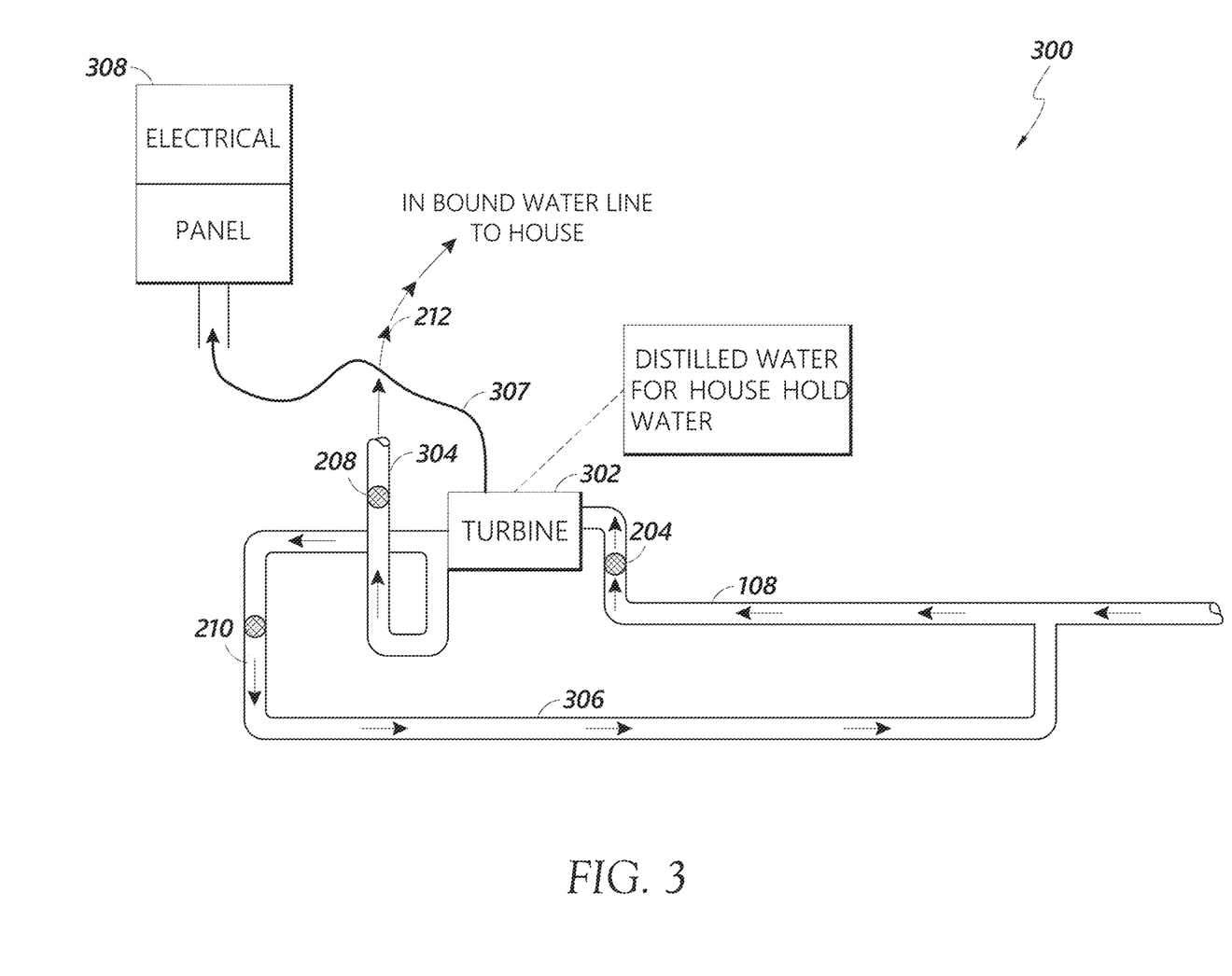
FIG. 3 is a diagram of an electricity generating system that replaces the water pressure reducing value of FIG. 2 and couples and reduces a water pressure between one of the plurality of buildings and the municipal water supply distribution system of FIG. 1 while also generating electricity.

FIG. 3 depicts a high level schematic of a hydroelectric generating system 300 that could replace and/or supplement the water pressure regulator 206 of FIG. 2 and enable generation of electricity for the building 110 based on water flow directed to the building 110. In some embodiments, the hydroelectric generating system 300 comprises many common components described above with respect to the water connection 200. For example, the hydroelectric generating system 300 includes the shutoff/gate valves 204 and 208, the backflow prevention device 210, the water inlet from the water main 108, and the water flow to the fixtures, piping, and devices 212 of the building 110. In addition to the common components, the hydroelectric generating system 300 also includes a turbine 302 between the pair of shutoff valves 204 and 208. An output of the turbine includes two water paths: 1) a first path 304 that provides water to the building 110 at the reduced water pressure (for example, 65 PSI), and 2) a second path 306 that creates a recirculation loop to return water back to the water main 108. In some embodiments, the turbine 302 may only have a single output, either the first path 304 that provides water to the building 110 or the recirculation loop 306. When the turbine 302 includes only the first path 304 to the building 110, the turbine 302 may generate electricity when the building is using water (thereby causing water to flow through the turbine 302 and rotate the turbine to generate electricity). When the turbine 302 includes only the recirculation path 306, the turbine 302 may generate electricity at all times because the water will flow through the turbine 302 all the time.

The turbine 302 may generate electricity based on rotation of the turbine 302 caused by movement of the water flowing through the turbine 302. The turbine 302 may be coupled to an electric panel 308 via conductor(s) 307, which distributes power to the building 110, for example via one or more circuit breakers or similar circuit protectors. In some instances, the turbine 302 may store electricity generated by the movement of the water flowing through the turbine 302 in an energy storage device, for example a battery and so forth. Additionally, the turbine 302 may reduce the water pressure of the water from the main line 108 (at approximately 100 PSI) to a more appropriate value (for example 65 PSI) to feed to the building 110 along the first path 304.

In operation, the water main 108 may provide water to the building 110 at approximately 100 PSI. The water from the water main 108 may flow through the opened shutoff/gate valve 204 and into the turbine 302. The turbine 302 may rotate or spin as water flows through the turbine 302, causing the turbine to generate electricity. In some embodiments, the water flows through the turbine 302 when the building 110 is demanding (or using) water through the first path 304. For example, when a faucet in the building 110 is turned on, this will cause water to flow from the water main 108 through the turbine 302 (which causes the turbine 302 to rotate and generate electricity) and into through the faucet. The electricity generated by the turbine 302 may be fed to the electric panel 308 for distribution throughout the building 110 or stored in the energy storage for later consumption or usage. Thus, the turbine 302 may generate electricity whenever water is used by the building 110. As described above, the turbine 302 will also act to reduce the water pressure from the main line 108 of 100 PSI to approximately 65 PSI to feed to the building 110, for example causing the water fed to the faucet to be at the reduced 65 PSI. Thus, the turbine 302 may replace the water pressure regulator 206 described with reference to FIG. 2, because a resistance of the turbine 302 (for example, resistance of the components that rotate to generate the electricity) may be used to reduce the pressure of the water from the main line 108.

In some embodiments, the recirculation loop 306 may provide a second path for the water to flow. For example, the recirculation loop 306 may enable the water from the water main to circulate continuously through the turbine 302 and back into the main line 108, thereby enabling the turbine 302 to generate electricity constantly without wasting water. For example, since the recirculation loop 306 is coupled to the main line 108, the main line 108 may be configured to create suction on the recirculation loop 306 due to the Venturi (or similar) effect caused by the water flowing through the main line 108. This suction on the recirculation loop 306 may cause water to be drawn through the turbine 302, enabling the turbine 302 to generate electricity whenever there is water flow through the main line 108.

In some embodiments, the turbine 302 includes a conversion circuit or similar circuitry (not shown in this figure) that conditions, regulates, and/or converts the electricity generated by the turbine 302 for conveyance to the electric panel 308 of the building 110. For example, the conversion circuit may convert the electricity generated by the turbine 302 to an alternating current (AC) signal that can be easily integrated with the circuitry of the building 110 (for example, a 120 VAC signal that is phase matched with the AC signals of the building 110).

In some embodiments, the turbine 302 is a turbo turbine and generates both electricity and distilled drinking water from the water flowing through the turbine 302. As described above, the recirculation loop 306 allows the turbine 302 to generate electricity and drinking water under constant pressure even when the building 110 is not requesting water. In some embodiments, the recirculation loop 306 includes a reservoir or other tank (not shown). The reservoir may improve backflow prevention. In some embodiments, a pressure reducer may be installed downstream of the turbine 302 to ensure that water provided to the building 110 is at an acceptable pressure for the building if the turbine 302 does not sufficiently reduce the water pressure.

In some instances, the hydroelectric generating system 300 of FIG. 3 may supplement electricity consumed by the typical household, for example producing approximately double the electricity consumed by the typical household. The hydroelectric generating system 300 may convey the generated electricity to the energy storage device (for example, a battery pack or module) for consumption on demand. In some embodiments, the distilled water produced when the turbine 302 is a turbo turbine may be conveyed to the building 110 via a separate line to enable use as drinking water.

In some embodiments, the hydroelectric generating system 300 may comprise a first pipe fitting configured to couple the main line 108 to an input or inlet of the turbine 302. The turbine may further comprise an outlet that is in fluid communication with the first pipe fitting such that the turbine rotates in response to a kinetic energy of the water from the main line 108. The water from the main line 108 may flow whenever the building 110 demands water, thereby causing the turbine 302 to rotate. In some embodiments, the water from the main line 108 flows due to the recirculation loop 306.

The turbine 302 may generate electricity in response to the rotation of the turbine 302 due to the water flow. The turbine 302 may also cause a reduction in the water pressure due to the resistance introduced by the turbine 302. The turbine 302 conversion circuit may be configured to condition the electricity generated by the turbine 302 so it is easily conveyed to the electrical panel of the building 110. The system 300 further comprises a second pipe fitting that is fluid communication with the outlet of the turbine 302. The second pipe fitting may couple the turbine 302 to the input pipe of the building 110. Alternatively, the second pipe fitting may couple the turbine 302 to the recirculation loop 306 and a third pipe fitting may couple the turbine 302 to the building 110.

Figure 4:
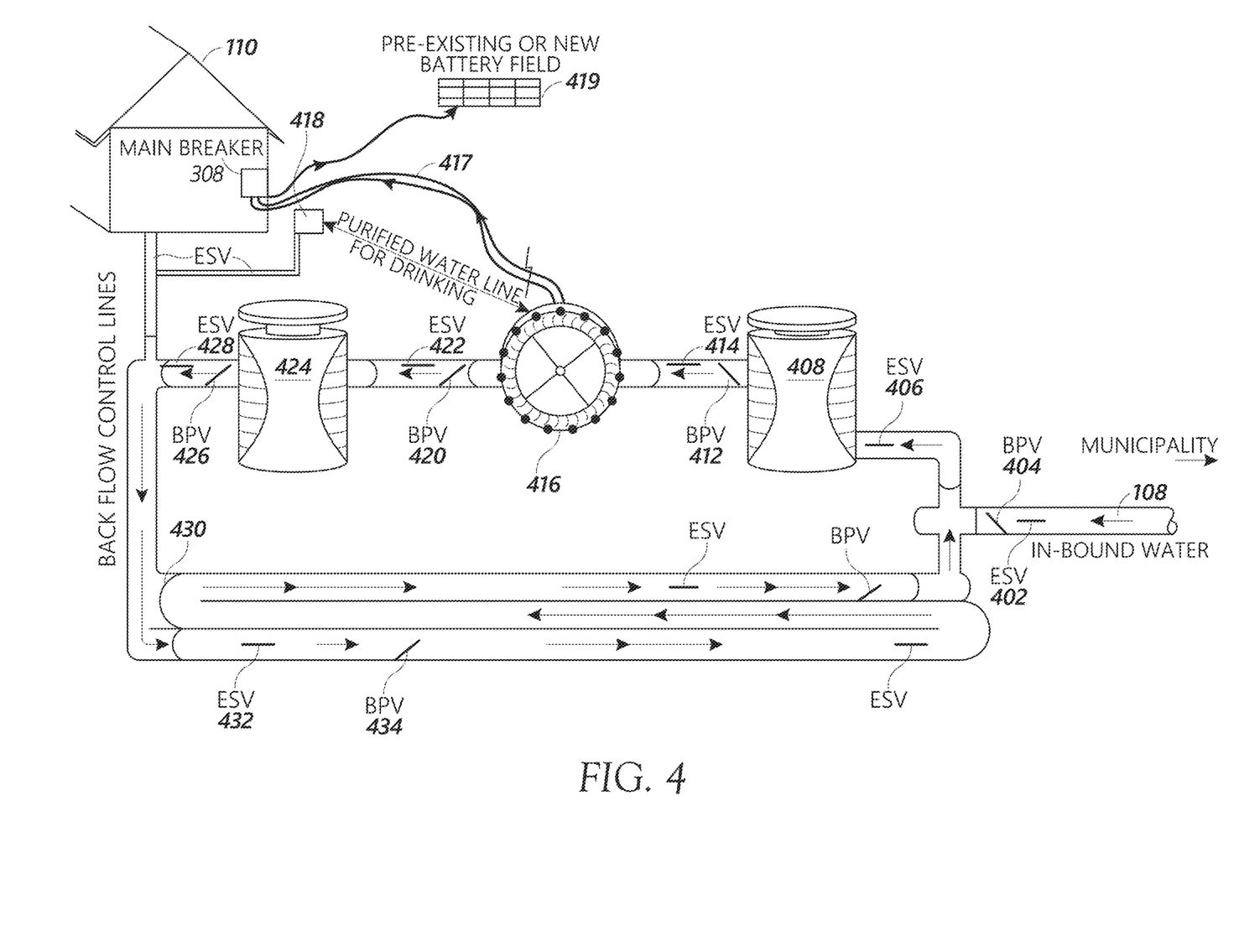
FIG. 4 is a diagram of another electricity generating system that couples and reduces a water pressure between the municipal water supply distribution system and one of the buildings of FIG. 1 while generating electricity and purified drinking water for the building.

FIG. 4 is a diagram of another electricity generating system 400 that couples to and reduces a water pressure between the water main 108 of the municipal water supply distribution system 100 and one of the buildings 110 of FIG. 1 while generating electricity and purified drinking water for the building.

The water main 108 may provide inbound water from the municipal water supply distribution system 100 to the system 400. Specifically, the water main 108 may be coupled to a first emergency shutoff valve (ESV) 402 of the system 400. The first ESV 402 may allow for stopping of water flow through the first ESV 402. Water from the water main 108 flows through the first ESV 402 (when in an open state) and through a backflow prevention valve (BPV) 404 that prevents water from flowing from the system 400 back into the water main 108 or the municipal water supply distribution system 100. In some embodiments, the water from the BPV 404 flows into a second ESV 406 at an input of a first water pressurization tank 408. In some embodiments, the first water pressurization tank 408 ensures that water provided by the water main 108 is at a particular pressure threshold value (for example, a minimum pressure threshold) before it progresses further through the system 400. In some embodiments, the first water pressurization tank 408 is used to control a pressure (for example, to a first PSI threshold) using a controller, a pump, or other similar control components (not shown in this figure). Water from the first pressurization tank 408 passes through a second BPV 412 (preventing backflow into the first water pressurization tank 408) and through a third ESV 414 to a turbo turbine 416. The turbo turbine 416 may rotate based on the pressure of the water from the first pressurization tank 408. While rotating due to the water pressure, the turbo turbine 416 may generate electricity. The electricity generated may be conveyed to the building 110 (for example, via a wire or other conductor 417). In some embodiments, the building 110 comprises a fuse or breaker box 308 through which the electricity generated by the turbo turbine 416 is conveyed to the building 110. In some embodiments, the electricity conveyed to the building 110 is stored in a storage device 419, for example one or more battery packs, super-capacitors, and so forth.

In some embodiments, when the turbo turbine 416 generates electricity based on the water flowing through and rotating the turbo turbine 416, the turbo turbine 416 rotation may generate heat and may cause at least a portion of the water flowing through the turbo turbine 416 to evaporate. In some embodiments, the turbo turbine 416 is configured to allow the evaporated water to condense and collect, for example in a water reclamation tank 418. In some embodiments, the evaporated and condensed water may be purified and the purified water from the water reclamation tank 418 may be provided to the building 110 as drinking water. In some embodiments, the drinking water for the building 110 is provided via a first inlet that includes one or both of an ESV or a BPV (not explicitly shown).

The water output by the turbo turbine 416 may have a reduced pressure as compared to the water at an input of the turbo turbine 416, for example due to having been reduced by the turbo turbine 416. In some embodiments, the water from the output of the turbo turbine 416 passes through a third BPV 420 (preventing backflow into the turbo turbine 416) and a fourth ESV 422 before flowing into a second pressurization tank 424. Similar to the first pressurization tank 408, the second pressurization tank 424 may be controlled via one or more components to increase or decrease the pressure of the water at the output of the turbo turbine 416. In some embodiments, the second pressurization tank 424 will maintain the water pressure at a second threshold pressure or PSI threshold, for example within a range sufficient to feed to the building 110. In some embodiments, the second threshold pressure or PSI threshold is established by the water input threshold for the building 110. The water flowing out of the second pressurization tank 424 may flow through a fourth BPV 426 (to prevent backflow into the second pressurization tank 424) and a fifth ESV 428 before it splits to flow into the building 110 (for example, via a second inlet). When the building 110 demands water, water will flow from the second pressurization tank 424 to the building 110. When the building 110 does not demand water, the water will flow from the second pressurization tank 424 into a backflow control line or system 430. In some embodiments, the backflow control line 430 includes at least a fifth BPV 434 and/or a sixth ESV 432. In some embodiments, the backflow control line 430 may allow the system 400 to run continuously by providing a path for the water from the second pressurization tank 424 to flow to an inlet of the system 400 (for example, tee-ing into the water main 108 prior to the first pressurization tank 408).

In some embodiments, the evaporated and/or condensed water generated by the rotation of the turbo turbine 416 may be provided to the building 110 while warm or above a first temperature threshold. By providing the water at the temperature above the first temperature threshold, the turbo turbine 416 and the system 400 may reduce a demand on a water heater of the building 110, reducing heated water costs for the building 110.

In some embodiments, the system 400 is configured to generate upward of 2000 kW-Hrs of electricity in a given month. In some instances, each connection of components, devices, pipes, etc., of the system 400 comprises one or more fittings to couple the components, pipes, devices, and so forth.

Additional Embodiments

As used herein, "system," "instrument," "apparatus," and "device" generally encompass both the hardware (for example, mechanical and electronic) and, in some implementations, associated software (for example, specialized computer programs for graphics control) components.

Further, the data processing and interactive and dynamic user interfaces described herein are enabled by innovations in efficient data processing and interactions between the user interfaces and underlying systems and components.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described herein generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various features and processes described herein may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various illustrative logical blocks and modules described in connection with the embodiments disclosed herein can be implemented or performed by a machine, such as a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable devices that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some, or all, of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

As used herein a "data storage system" may be embodied in computing system that utilizes hard disk drives, solid state memories and/or any other type of non-transitory computer-readable storage medium accessible to or by a device such as an access device, server, or other computing device described. A data storage system may also or alternatively be distributed or partitioned across multiple local and/or remote storage devices as is known in the art without departing from the scope of the present disclosure. In yet other embodiments, a data storage system may include or be embodied in a data storage web service.

As used herein, the terms "determine" or "determining" encompass a wide variety of actions. For example, "determining" may include calculating, computing, processing, deriving, looking up (for example, looking up in a table, a database or another data structure), ascertaining and the like. Also, "determining" may include receiving (for example, receiving information), accessing (for example, accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (for example, transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), ADOBE® FLASH®, JAVA®, MICROSOFT® .NET®, web services, and rich site summary (RSS). In some implementations, a UI may be included in a stand-alone client (for example, thick client, fat client) configured to communicate (for example, send or receive data) in accordance with one or more of the aspects described.

Disjunctive language such as the phrase "at least one of X, Y, or Z," unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

All of the methods and processes described herein may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the herein-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated herein, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Those of skill in the art would understand that information, messages, and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

What is claimed is:

1. A system for generating electricity for a building, the system comprising:
    a first input pipe that supplies water from a water distribution system;
    a first pressurization tank comprising an inlet and an outlet;
    a first pipe fitting configured to couple the first input pipe to the inlet of the first pressurization tank in series through a first backflow protection valve (BPV) and a first emergency stop valve (ESV);
    a turbine configured to rotate in response to water that flows through the turbine from an inlet of the turbine to an outlet of the turbine to thereby generate electricity that is provided to the building;
    a second pipe fitting configured to couple the outlet of the first pressurization tank to the inlet of the turbine in series through a second BPV and a second ESV;
    a second pressurization tank comprising an inlet and an outlet;
    a third pipe fitting configured to couple the outlet of the turbine to the inlet of the second pressurization tank in series through a third BPV and a third ESV;
    a water circulation system comprising an inlet and an outlet;
    a second input pipe that provides water from the second pressurization tank to the building;
    a fourth pipe fitting configured to couple the outlet of the second pressurization tank to the inlet of the water circulation system and to the second input pipe; and
    a fifth pipe fitting configured to couple the outlet of the water circulation system to the water distribution system,
    wherein the first pressurization tank is configured to maintain a water pressure at the inlet of the turbine at a first pressure threshold,
    wherein the first pressure threshold is established based on operational requirements of the turbine,
    wherein the second pressurization tank is configured to maintain a water pressure at the outlet of the turbine at a second pressure threshold, and
    wherein the second pressure threshold is established based on requirements of the building.

2. The system of claim 1, further comprising a conversion circuit configured to:
    condition the generated electricity generated by the turbine for consumption by the building, and
    convey the conditioned electricity to the building via one or more conductors.

3. The system of claim 2, wherein the conversion circuit is further configured to convert the conditioned electricity to an alternating current signal prior to the conveying of the conditioned electricity to the building.

4. The system of claim 1, wherein the turbine is configured to reduce a pressure of the water from a first pressure to a second pressure between the inlet of the turbine and the outlet of the turbine.

5. The system of claim 1, wherein the turbine is a turbo turbine.

6. The system of claim 1, further comprising a backflow control line configured to allow the system to run continuously by providing a path for the water from the outlet of the second pressurization tank to the inlet of the first pressurization tank.

7. The system of claim 1, further comprising a storage device configured to store at least a portion of the generated electricity.

8. The system of claim 7, wherein the storage device comprises one or more battery packs.

9. The system of claim 7, wherein the storage device comprises one or more super-capacitors.

10. The system of claim 1, wherein the water circulation system is configured to recirculate excess water not flowing into the building back to the water distribution system.

11. A method of generating electricity for a building, the method comprising:
    storing water from a water distribution system in a first pressurization tank by conveying the water from an inlet pipe of the water distribution system through a first backflow protection valve (BPV) and a first emergency stop valve (ESV) and into the first pressurization tank;
    enabling flow of the water from an outlet of the first pressurization tank into an inlet of a turbine by conveying the water through a second BPV and a second ESV in response to the water having a first water pressure;
    maintaining, within the first pressurization tank, the first water pressure at a first water pressure threshold, wherein the first water pressure threshold is established based on operational requirements of the turbine;
    causing the turbine to rotate in response to the flow of the water through the turbine from the inlet of the turbine to an outlet of the turbine to thereby generate electricity that is provided to the building;
    storing the water from the turbine in a second pressurization tank by conveying the water from the outlet of the turbine to an inlet of the second pressurization tank through a third BPV and a third ESV;
    enabling flow of the water from the second pressurization tank into the building in response to the water having a second water pressure;
    maintaining, within the second pressurization tank, the second water pressure at a second water pressure threshold, wherein the second water pressure threshold is established based on requirements of the building;
    causing excess water not flowing into the building to flow into a water circulation system in response to the water having the second water pressure; and
    recirculating the excess water through the water circulation system and back to the water distribution system in response to the water having the second water pressure and the excess water not flowing into the building.

12. The method of claim 11, further comprising reducing a pressure of the water from the first water pressure to the second water pressure between the inlet of the turbine and the outlet of the turbine.

13. The method of claim 12, further comprising conditioning the generated electricity generated by the turbine for consumption by the building and conveying the conditioned electricity to the building via one or more conductors.

14. The method of claim 13, wherein said conditioning comprises converting the generated electricity to an alternating current signal.

15. The method of claim 11, further comprising storing at least a portion of the generated electricity in a storage device.

16. The method of claim 15, wherein the storage device comprises one or more battery packs.

17. The method of claim 15, wherein the storage device comprises one or more super-capacitors.

* * * * *